UNITED STATES PATENT OFFICE.

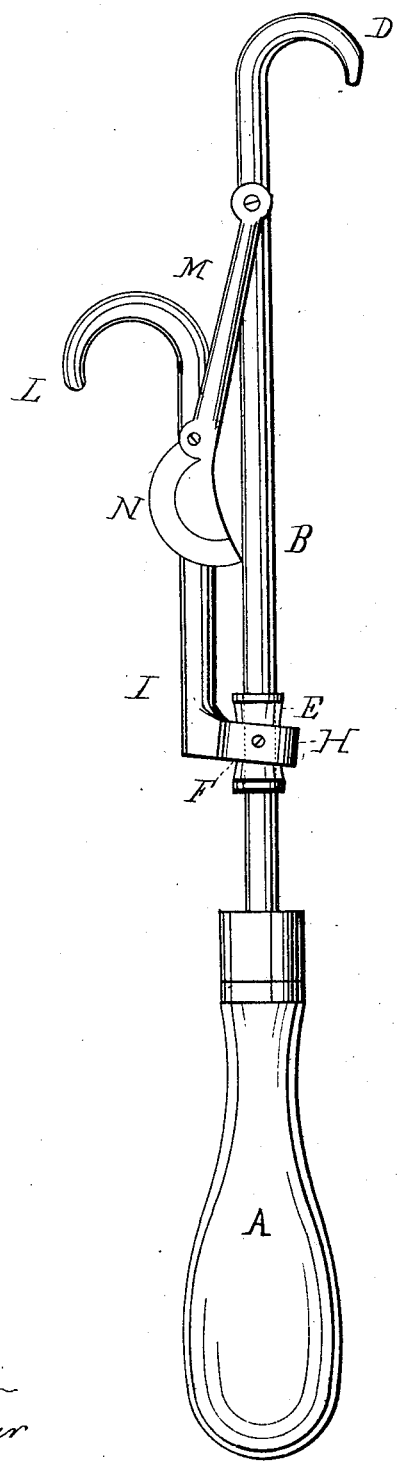

WILLIAM CARR, OF WEST HAYDEN, OHIO.

IMPROVEMENT IN PRUNING IMPLEMENTS.

Specification forming part of Letters Patent No. 167,154, dated August 31, 1875; application filed May 10, 1875.

*To all whom it may concern:*

Be it known that I, WILLIAM CARR, of West Hayden, Franklin county, Ohio, have invented a new and useful Improvement in Pruning-Hooks, of which the following is a specification, reference being had to the accompanying drawings.

The invention relates to a device for pruning trees, and consists in the arrangement of devices hereinafter set forth.

The object of the invention is to provide a useful and effective implement for trimming and pruning.

A in the accompanying drawings is the handle, to which is firmly secured the rod B, the upper part of which is fashioned into a hook, D, the purpose of which is to remove the severed limbs, twigs, and brush.

The slide E is arranged to operate upon the rod B, and passes through and is pivoted within the aperture F in the foot H, secured to the lower end of the shank I of the hook L, which is flattened on one side. The rod B and shank I and hook L are placed in the same plane, as shown. The bar M is pivoted at one end to the rod B, a short distance below the hook D, and near its other end is pivoted to the shank I, the extremity of the bar being provided with the knife N, having an edge of rounded outline, which, as the device is drawn downward, passes across the flat surface of the hook L.

The operation of my invention is as follows: The hook L is placed over the limb to be severed, and a downward tension exerted; this brings up the knife N in contact with the lower side of the limb, and the tension being continued severs it from the tree.

What I claim as my invention, and desire to secure by Letters Patent, is—

The combination of the rod B, slide E, foot H, hook L, and bar M, having the knife N, substantially as specified.

In testimony that I claim the foregoing improvement in pruning-hooks, as above described, I have hereunto set my hand and seal this 24th day of May, 1875.

WM. CARR. [L. S.]

Witnesses:
   A. M. L. CAMPBELL,
   C. H. CARPENTER.